G. L. MILLER.
METHOD OF AND APPARATUS FOR GAGING AND ASSORTING TAPER PIECES.
APPLICATION FILED SEPT. 18, 1920.

1,367,199.

Patented Feb. 1, 1921.

G. L. MILLER.
METHOD OF AND APPARATUS FOR GAGING AND ASSORTING TAPER PIECES.
APPLICATION FILED SEPT. 18, 1920.

1,367,199.

Patented Feb. 1, 1921.

G. L. MILLER.
METHOD OF AND APPARATUS FOR GAGING AND ASSORTING TAPER PIECES.
APPLICATION FILED SEPT. 18, 1920.

1,367,199.

Patented Feb. 1, 1921.

UNITED STATES PATENT OFFICE.

GEORGE L. MILLER, OF CANTON, OHIO, ASSIGNOR TO THE GILLIAM MANUFACTURING COMPANY, OF CANTON, OHIO, A CORPORATION OF OHIO.

METHOD OF AND APPARATUS FOR GAGING AND ASSORTING TAPER PIECES.

1,367,199.   Specification of Letters Patent.   Patented Feb. 1, 1921.

Application filed September 18, 1920. Serial No. 411,251.

*To all whom it may concern:*

Be it known that I, GEORGE L. MILLER, a citizen of the United States, residing at Canton, in the county of Stark and State of Ohio, have invented a new and useful Improvement in Methods of and Apparatus for Gaging and Assorting Taper Pieces, of which the following is a specification.

This invention relates particularly to a method of gaging taper pieces, such as taper rollers for roller-bearings, and apparatus for gaging and assorting taper articles of this character.

The primary object is to provide an improved method and simple and thoroughly effective apparatus for gaging and assorting the rollers of taper roller-bearings.

It may be stated preliminarily that according to a method of manufacturing roller-bearings now employed, the taper rollers and the inner cones, or inner race-members, are first produced in screw-machines; then ground; then inspected; and finally assorted into different lots. In the grinding operation, the rollers are ground approximately three thousandths of an inch. It is customary, in order to obtain bearings of accurate dimensions, within the limits of variation permissible, to manufacture the outer race members or cups accurately, that is, the necessary time for grinding the cups accurately to dimensions is taken; but to increase the production and cheapen the manufacture, the method of producing the rollers and cones in screw-machines and grinding them quickly is followed. This method results in the production of inner cones and rollers which vary somewhat in dimensions. It is found, in practice, that approximately one-third of the inner cones will be of standard size, approximately one-third will be above standard size, and approximately one-third will be below standard size. It is found, also, that the rollers produced will vary somewhat in size, so that by selecting those which are very close to standard size they may be introduced into a bearing having an inner cone of standard size, and thus produce a bearing of standard size; by selecting rollers below the standard size and introducing them into a bearing having a cone above standard size, the result is to provide a bearing of standard size; and by selecting rollers which are above standard size for a bearing having a cone below standard size, the result is to produce a bearing of standard size.

In practice, it usually is regarded as permissible to have the bearing vary in overall length either ten thousandths of an inch above or ten thousandths of an inch below a selected standard length. In accordance with such practice, it is found that the rollers may not vary more than one-fourth of one thousandth of an inch, or .00025 of an inch.

From the foregoing, it will be seen that it is highly important to be able to carefully gage the rollers, in order that all the rollers in a given bearing may perform their duty in the proper manner. Heretofore, efforts have been made to gage the rollers by means of gage-members adapted to contact with the circumferential surfaces of the rollers and effect the discharge of the rollers from the machine at various points, according to their size. Such a method involves virtually an attempt to measure differences in diameters of the rollers, and it will be understood that because of the slight variations in the diameters of the rollers, accurate gaging and assorting is impossible.

In accordance with the proposed method the taper rollers are introduced into accurately prepared taper sockets from which they project, and the projecting ends are carried past a series of graduated gage-members which serve as contact points for electric circuits which control the discharge of the rollers from the sockets. It will be seen that a very slight variation in the diameter of the roller will make a very considerable difference in the distance which the roller will project from the socket; hence, by following the method here referred to, it is possible to attain great accuracy in assorting the rollers, without the necessity of the utmost accuracy in the construction of the apparatus for effecting this result.

In accordance with the proposed method, as practised in the preferred form of apparatus, the taper rollers are introduced into master sockets carried by a rotating table; are thus carried past an annular series of gage-members which serve as contact points for electric circuits; and there discharged, in assorted condition, into an annular series of receptacles, the discharge being effected by means of spring-pressed plungers associated with the sockets, the operation of the plungers being controlled by the electric circuits. In the preferred apparatus, each plunger is normally held retracted by a bell-crank latch-member which is adapted to be tripped by a trip-pawl associated with a trip-pawl magnet which normally holds the trip-pawl elevated, or out of the tripping position, and the circuit of each trip-pawl magnet is controlled by a circuit-controlling solenoid having a circuit for which the corresponding gage-member forms a contact point.

The preferred apparatus for practising the improved method is illustrated in the accompanying drawings, in which—

Fig. 3, a broken plan view taken as indicated at line 3 of Fig. 2; Fig. 4ª, a broken sectional view illustrating the relation of the taper roller to the thrust flange of the inner cone, or inner race member, of the roller bearing.

In the construction illustrated, A represents the frame of the machine, the upper portion of which is provided with an internal spider A′ in which is fixedly mounted a central tubular post A² which supports at its upper end a rigidly attached platform or frame-member A³ which serves to support the electro-magnets; B, a rotary table journaled to rotate about the central post A² and which carries, at or near its periphery, an annular series of sockets B′, and associated therewith an annular series of roller-ejecting devices B²; C, an annular series of gage-members mounted on the frame adjacent the path of movement of the projecting ends of rollers mounted in the sockets mentioned; C′, a series of circuit-controlling solenoids, in whose circuits the gage-members C serve as contact-members; C², a series of trip-magnets having circuits controlled by the magnets C′; D, an annular series of discharge conduits; and D′, an annular series of receptacles disposed beneath the discharge conduits D and removably mounted on an annular ledge or platform A⁴ which encircles and is supported on the frame A.

The frame A may be of any desired construction. Preferably, it is in the form of a large annular standard or pedestal 17, surmounted by a removable annular section 18. The section 18 carries the spider A′, which comprises arms 19 and a central ring 20 in which the lower end of the tubular post A² is secured by means of a set screw 21.

The table B has a hub portion or sleeve 22, in which is mounted a split taper-sleeve 23 which serves as a bearing about the stationary post A² which thus serves as a vertical journal. The hub 22 rests on a ball-bearing 24 which is supported by a large annular nut 25 which has threaded connection with a ring 26 which is securely attached to the hub portion 20 of the spider A′. Thus, the bearing 24 may be adjusted vertically to raise the rotary carrier or table B to the proper position. The carrier B is shown provided near its periphery, on its lower side, with an annular flange 27 which preferably slightly clears an annular bearing surface 28 with which the frame is provided. The taper-sleeve 23 may be adjusted by means of a threaded collar 29 which is equipped with a lock nut 30.

The rotary carrier B has its hub portion 22 equipped with a worm-wheel 31, actuated by a worm 32 which is journaled in the frame.

Figure 7:
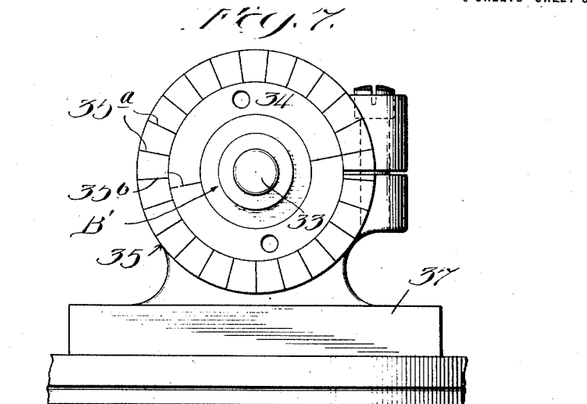
Fig. 7, a broken elevational view illustrating the mounting for one of the master sockets employed.

As has been indicated, the sockets B′ are arranged in a series near the edge or periphery of the carrier B. These sockets serve to receive the rollers, or taper pieces 33, which are to be gaged. As will be understood from Figs. 3 and 7, each socket B′ is removably mounted in a sleeve 34 which has screw connection with a split-ring mounting 35 carried by the table B and fixedly mounted thereon. The split-ring is provided with graduations 35ª, as shown in Fig. 7; and the sleeve 34 is shown provided with lines 35ᵇ to enable a fine adjustment to be attained. After the socket 34 is properly adjusted, the split-ring 35 is tightened thereon by means of a set-screw 36. The socket B′ fits snugly in the sleeve 34 and is suitably shouldered, so that its outer end will project just the required distance. In other words, when the sleeve 34 is adjusted, the socket B′ is adjusted therewith. The sockets B′ are removable and interchangeable with other sockets, adapting the machine to serve the purpose of gaging and assorting rollers of various sizes.

The split-rings 35 which serve as mountings for the sockets are shown as formed integrally with the outer ends of radial plates 37 mounted on the upper surface of the table, in suitable sockets; and the ejecting devices B² for discharging the rollers from the sockets are mounted on the plates 37.

Each device B² comprises a standard 38 having a horizontal radial bore, through which extends an ejecting plunger 39, adapted to be projected outwardly in a radial direction by a spring 40. The outer end of the plunger is reduced in diameter and is adapted to enter the socket B' to eject the roller, and it preferably is in the form of an adjustable plug, or tip, 39ª, enabling the plunger to be adjusted for rollers of different lengths. The inner end of the plunger is fitted with a vertical pin or stud 41, whose lower end is suitably notched to engage the outturned arm of a bell-crank lever 42 which is mounted on a pivot 43. The latch-lever 42 has an upturned arm 42ª fitted with a radial set-screw 42ᵇ which serves as a cam which is adapted to be engaged by a trip-cam, when the cam is dropped by the magnet which normally holds it in elevated position. A spring 44 serves normally to hold the latch-member 42 in the latched position. Each plunger 39 is provided with a vertical stud or finger-piece 45 which projects through a slot 46 in the tubular member 38, thus enabling the plunger to be moved to the retracted or "set" position by hand, if desired. The studs 45 also serve as cam-studs which enable the plungers to be automatically restored to the latched position, as will be explained later.

The latch members 42 are adapted to be tripped by means of an annular series of trip-pawls 47. These are shown as in the form of bell-crank levers mounted on pivots 48 carried by the frame-member A³. These trip-pawls have outwardly extending radial arms 47ª, whose outer ends are provided with cam surfaces; and the pawls have depending arms 47ᵇ fitted with set-screws 47ᶜ which serve as cams which are adapted to be engaged by cam-teeth 49 on a ring 49ª which is fixedly secured to the central portion of the rotary carrier B so as to rotate therewith. The arms 47ª of the trip-pawls serve as armatures for the series C² of magnets, and normally said arms are held elevated by said magnets. The function of the toothed cam-ring 49ª is to engage the set-screws 47ᶜ and thus elevate the trip-cams 47 so that they are brought within range of the magnetic action of the solenoids.

Figure 1:
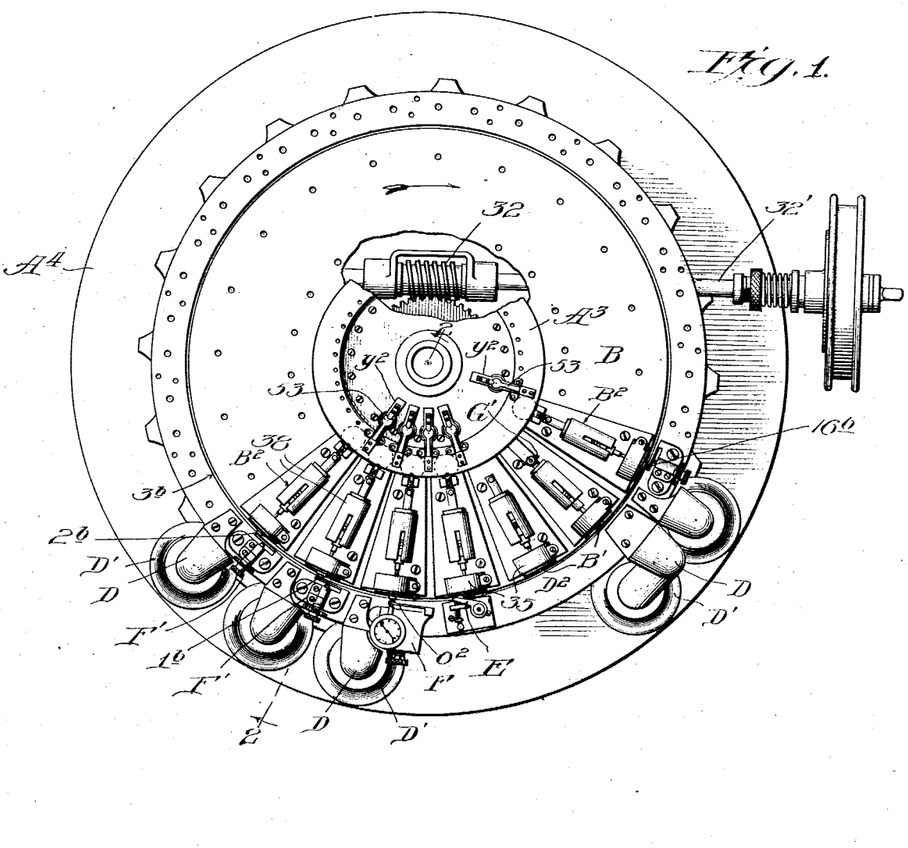
Figure 1 represents a broken plan view of a roller-gaging and assorting machine.
Figure 2:
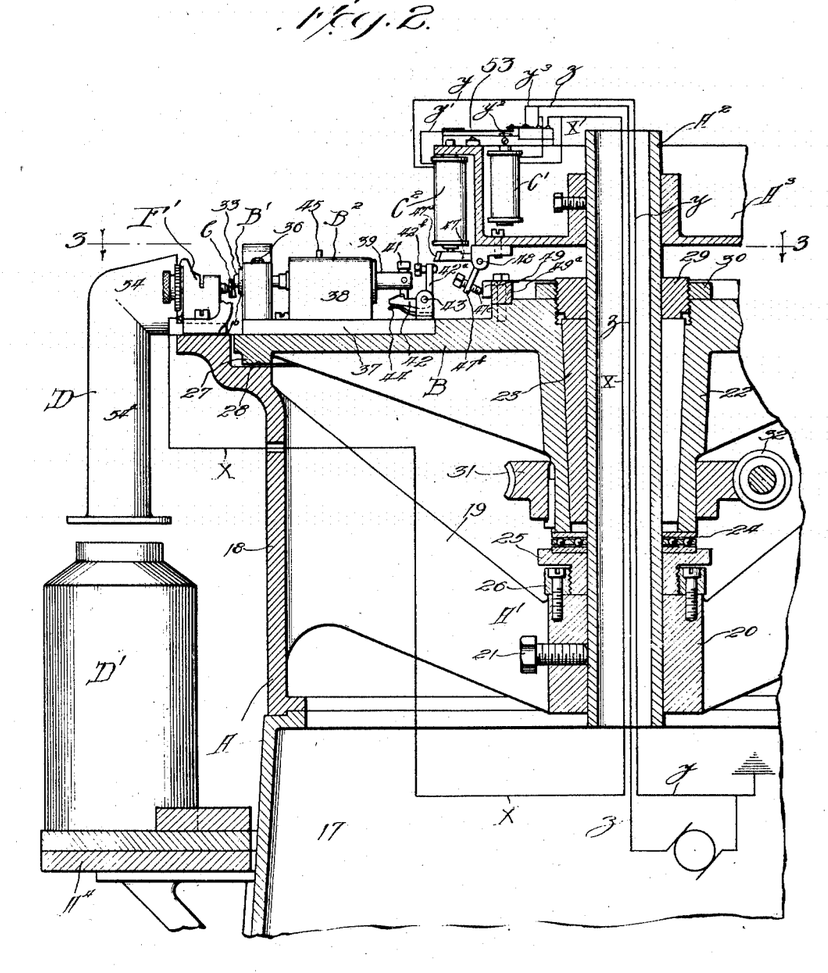
Fig. 2, a broken vertical sectional view, on an enlarged scale.

In the machine illustrated, the rollers are placed in the sockets B' as they pass the point D² in Fig. 1. The rollers are pressed snugly into the sockets, with uniform pressure, by a pivoted spring-held pressure member E, which is mounted on the frame adjacent the periphery of the rotary carrier, as shown in Fig. 1. The pressure member E serves as a wiper which engages the ends of the rollers and presses them snugly into the sockets, as the sockets are carried past the wiper.

In Fig. 1, F represents a micrometer adjustment for a contact point which serves to make contact with the projecting ends of over-size rollers and cause the over-size rollers to be ejected for discard.

Figures 4, 4A, 5:
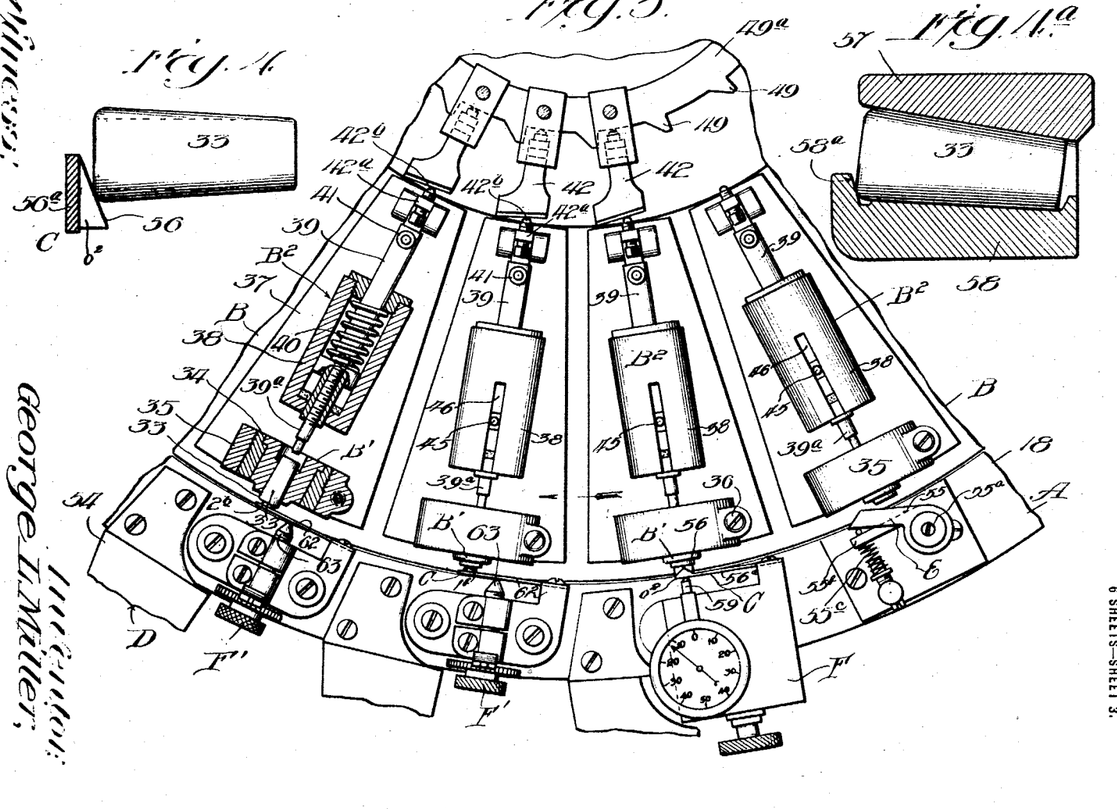
Fig. 4, a vertical sectional view illustrating the relation of one of the taper rollers to one of the gage-members, or contact-members employed.
Fig. 5, a broken plan view, partly in section, illustrating the means for effecting discharge of under-size rollers, that is, rollers which will be rejected as too small, this view showing also the means for restoring the plungers to the "set" or latched position.
Figure 5:
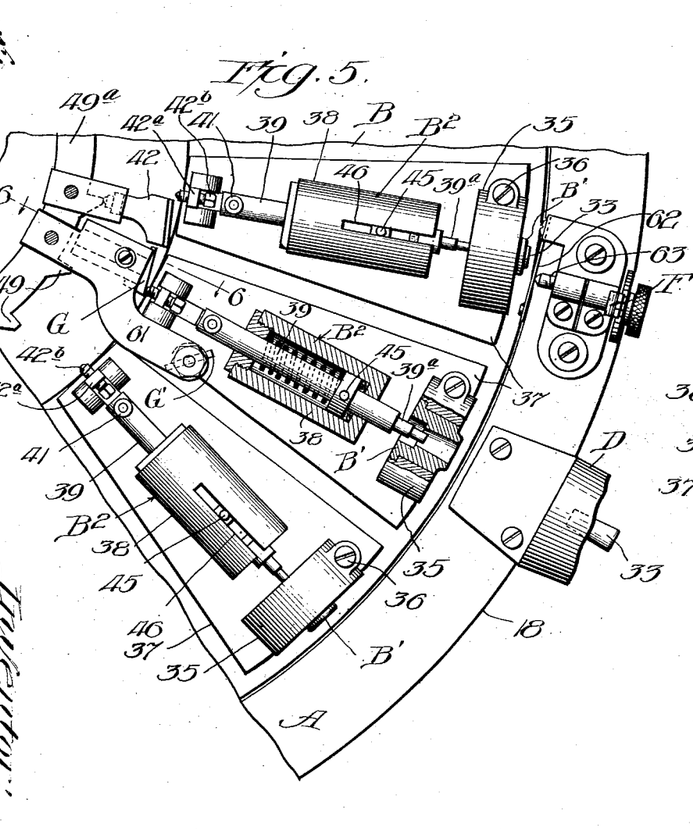

In the machine illustrated, provision is made for assorting the rollers into sixteen different lots, in addition to the over-size rollers and also in addition to the under-size rollers, both the over-size rollers and the under-size rollers being rejected. In Figs. 1 and 5, G represents a fixed, stationary trip-cam and G' represents a restoring-cam. As the machine operates, the under-size rollers are carried around in the sockets, without completing any electric circuit; hence, the ejecting devices do not operate until the fixed stationary cam G trips the latch-members. When this occurs, the under-size rollers are ejected from the sockets, and an instant later the plungers are automatically restored to the latched position by the fixed stationary cam G', which serves to restore all of the plungers to the latched position as they pass said cam.

Bearing in mind that provision is made for ejecting first the over-size rollers and then the usable rollers in sixteen different assortments, by operating the ejecting devices through the medium of the electromagnetic devices, it will be understood that the machine is provided with seventeen magnetic controlling devices for the ejecting devices.

Figure 9:
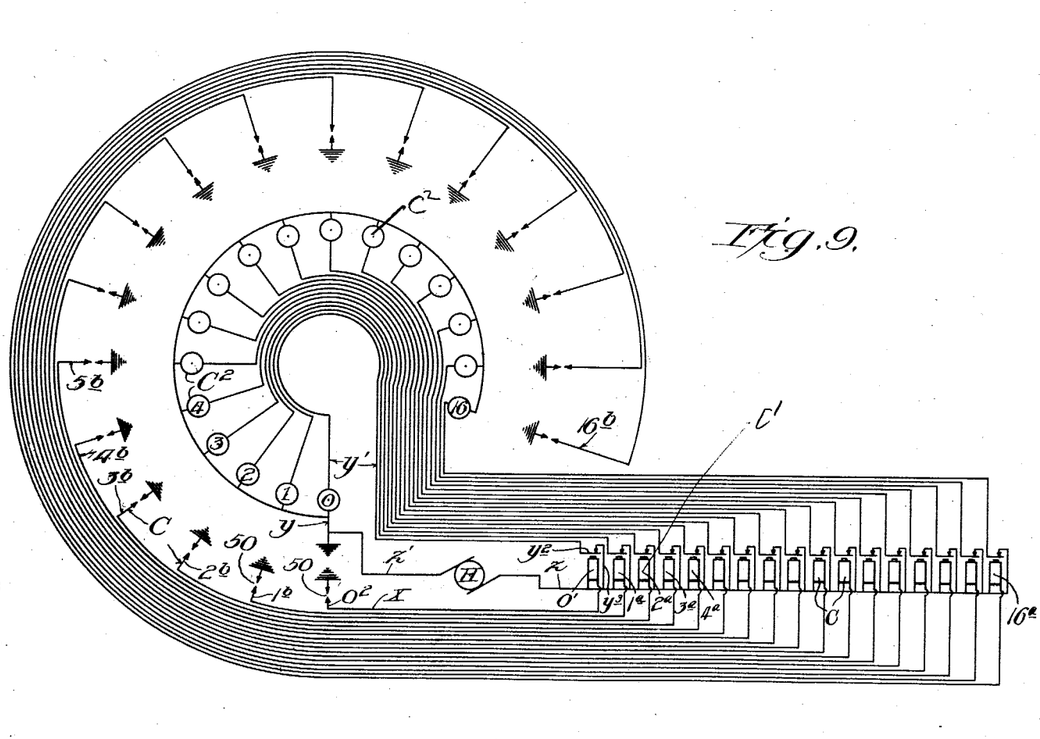
Fig. 9, a diagrammatic view illustrating the electric circuits of the electro-magnetic mechanism.

The solenoids of the C² series, that is, the solenoids which normally hold the trip-pawls 47 out of action, are diagrammatically illustrated in Fig. 9, the solenoid controlling the discharge of the over-size rollers being designated $o$ and the remaining solenoids of the series being designated 1, 2, 3, etc., up to 16. In the same diagram, the solenoids of the C' series, that is, the series which serves to control the circuits of the solenoids of the C² series, are designated $o'$, 1ª, 2ª, 3ª, etc. up to 16ª. In the same diagram, the contact points which correspond with the gage-members of the C' series are designated $o^2$, 1ᵇ, 2ᵇ, 3ᵇ, etc., up to 16ᵇ. The circuits are so arranged that the circuits of the solenoids of the C' series will be completed when the rollers carried by the sockets come into contact with the contact members of the C series, that is, with the gage-members which serve as electric contacts. In Fig. 1, only a few of these gage-members, or contact members, are shown, and only a limited number of the ejecting devices is shown, but it should be understood that in the machine being described the rotary carrier B is, in practice, equipped with the full series of contact-members and with a sufficient number of ejecting devices for the purpose. Of course, it is understood, also, that a machine may be designed to carry any suitable number of ejecting devices and make any desired number of assortments.

In Fig. 9, it is to be understood that the circuits of the magnets of the C' series will be completed when the spaces 50 are bridged, as will happen when a roller makes contact with one of the gage-members. For illustration, the circuit of which the contact-point $o^2$ forms a part may be understood as passing by the conductor $x$ to the solenoid $o'$, from the solenoid through a return conductor $z$ to a source of electric energy, such as a generator H, and through a conductor $z'$ to the frame of the machine, through the frame of the machine to the socket carrying the roller, the circuit being finally completed by the roller bridging the space 50 when the gage-member $o^2$ is encountered by the roller. In the same manner, the circuits for any of the other gage-members may be traced. The circuits for the solenoids of the $C^2$ series may be understood as passing from the frame of the machine through a conductor $y$ to the solenoids, from the solenoids through the make-and-break devices to the conductor $z$, through the generator and then back through the conductor $z'$ to the conductor $y$. For example, the circuit of the solenoid $o$ may be traced from the generator H through the conductor $z'$ to the conductor $y$, through the coil of the solenoid, then through the conductor $y'$ to the make-and-break device $y^2$, and back by conductor $y^3$ and conductor $z$ to the generator. In a similar manner, the circuit for any of the solenoids of the $C^2$ series may be traced through the make-and-break devices corresponding with the make-and-break device $y^2$, as illustrated in Fig. 9.

Figure 8:
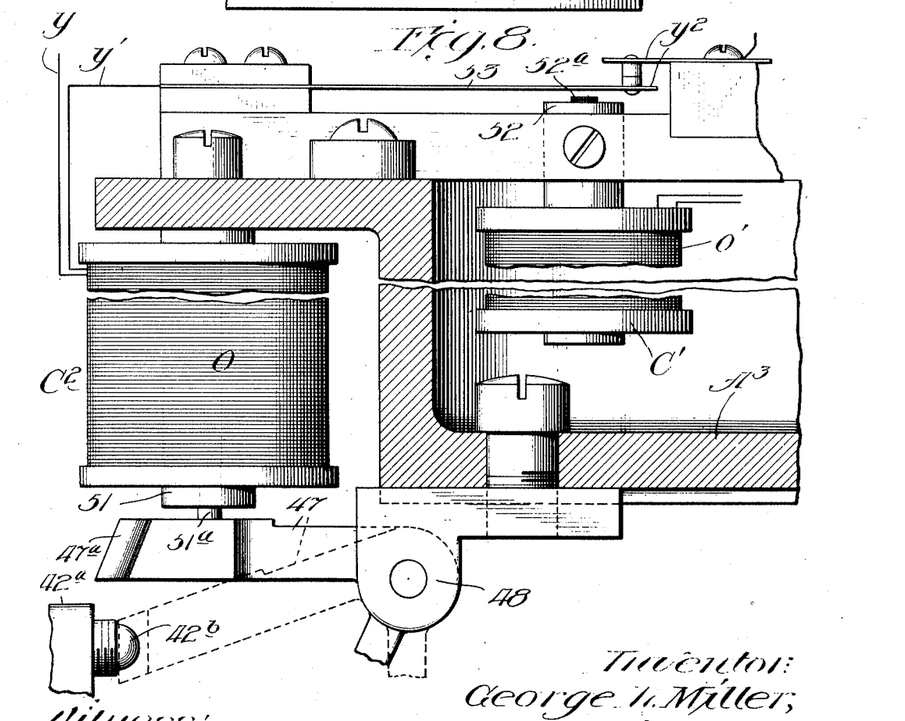
Fig. 8, an enlarged broken sectional detail view, illustrating the manner in which the circuit-controlling magnets control the circuits of the trip-pawl magnets.

As shown in Fig. 8, the solenoids of the $C^2$ series are provided with cores 51, which are preferably fitted with copper tips $51^a$, enabling the solenoids to quickly drop the trip-levers 47 when the circuits of the solenoids are broken. Also, the solenoids of the C' series are provided with cores 52 which are preferably equipped with fiber tips $52^a$, which serve to prevent the vibrators 53 of the make-and-break devices from sticking to the cores.

The chutes or discharge-conduits D which are mounted in an annular series about the periphery of the frame of the machine are in the form of elbows having short radial arms 54 and vertical arms $54^a$. The rollers are discharged through the horizontal arms and dropped through the vertical arms into the receptacles D'. The over-size rollers are received in the receptacle which is shown near the micrometer adjustment F in Fig. 1; and the under-size rollers are received in the receptacle which appears at the right of the point $D^2$ in Fig. 1. The assorted rollers which are capable of being used in bearings are received in the intervening receptacles of the series.

The pressure member E will be readily understood from Fig. 3. It comprises a wiper-arm 55 mounted to swing about a vertical pivot $55^a$ carried by the frame; and an integral arm $55^b$ which is pressed inwardly by a spring $55^c$.

The gage-member or contact-member $o^2$ of the C series of gage-members is illustrated in Fig. 3. It is in the form of a cam 56 carried by a flat spring $56^a$. This is shown also in Fig. 4, which shows the relation of the contact-member to the large end of the roller 33. Fig. $4^a$ shows a portion of a roller bearing comprising a cup or outer-race-member 57, an inner cone or race-member 58, and the interposed rollers 33. The inner cone 58 is equipped with an annular flange $58^a$ against which the rounded annular corners of the large ends of the rollers bear when the rollers are in use. The cam 56 of each gage-member is designed to bear the same relation to the rounded corner of the large end of the roller as does the flange $58^a$ of the cone of the roller-bearing. This insures the accurate fitting of the rollers in the bearing when they are in working position.

The first contact point or gage-member, that is the gage-member $o^2$, is adjusted by the micrometer device F, which, however, has a yielding plunger 59 which bears against the spring $56^a$, but which will allow the spring to yield to permit a roller which is too large to pass without causing injury to the machine. Such a roller, making contact, will at once be ejected.

The remaining gage-members of the C series, commencing with the member $1^d$, are set in finely graduated positions, being successively set closer and closer to the paths of the rollers, so that the larger rollers will make contact successively with the first contact-members of the series, then smaller rollers will make contact, then still smaller rollers will make contact, and so on, until the assortment is completed. Those rollers which fail to make contact will be ejected as under-size rollers when the fixed stationary trip-cam G is encountered by the latch-levers.

Figure 6:
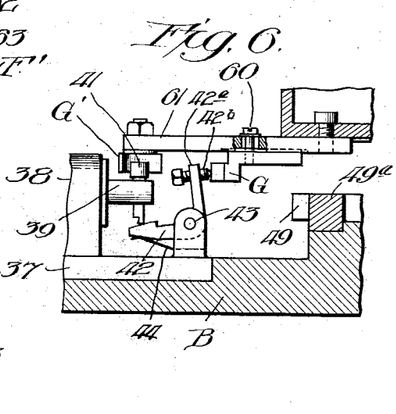
Fig. 6, a broken sectional view taken as indicated at line 6 of Fig. 5 and showing details of the trip-cam which effects the discharge of the under-size rollers and showing also the cam which restores the plungers to the latched position.

The cam G is shown in Fig. 6 as being radially adjustable by means of a set-screw 60 which passes through a slot in a bracket-arm 61, which bracket-arm serves also to carry the plunger-restoring cam G'. This cam G' has an oblique cam surface which engages studs 41 of the plungers 39, and forces the plungers inwardly, that is, toward the center of the machine, thus enabling the studs 41 to be engaged by the latch-members 42.

The gage members $1^b$, $2^b$, etc., are carried by spring-arms 62 engaged by the points of screws 63 of the micrometer adjusting devices F'. The screws 63 hold these gage-members in such manner that they are capable of very slight movement, indeed, when encountered by the rollers as they are carried by the sockets.

From the description given, it will be understood that as the plungers pass the cam G', they are "set" in their retracted or latched position; that as the sockets B' are carried in their orbit, the rollers are inserted in the sockets as they pass the point $D^2$; that the rollers are pressed into the sockets by the pressure-member E, which acts as a wiper; that as the rollers are carried past the gage-member $o^2$ the over-size rollers make contact therewith, close the electric circuit, and cause the corresponding ejecting device to operate and eject the over-size rollers into the first receptacle D'; that as the remaining rollers are carried past the remaining gage-members of the series, those rollers which are of suitable size make contact with the respective gage-members, according to the varying size of the rollers, thus causing the ejecting devices to operate and eject the rollers, in assorted lots, into the several receptacles; and, finally, that the plungers corresponding with those sockets which carry rollers of under-size are unlatched as they pass the cam G, which causes the under-size rollers to be ejected into the last receptacle of the series, the cam G' operating to restore each of the plungers to the latched position as they are carried past it.

The use of open-ended taper sockets arranged at the edge of the carrier and associated ejectors controlled by electro-magnetic devices, having circuits controlled by gage-members arranged to make contact with the outer ends of the rollers carried by the sockets, enables a method of assortment to be adopted which insures great accuracy of assortment of the rollers. Further, this method can be practised in a machine of simple construction having provision for ready interchangeability of sockets to adapt the machine to the gaging and assorting of rollers for bearings of different sizes, and such a machine operates with certainty and is easily maintained in operative condition.

The foregoing description has been given for clearness of understanding only, and no unnecessary limitations should be understood therefrom, but the appended claims should be construed as broadly as permissible in view of the prior art.

What I regard as new, and desire to secure by Letters Patent, is—

1. The combination of a taper-socket adapted to receive a taper piece for gaging purposes, a gage-member adapted to contact with the end portion of a taper piece carried in said socket, and ejecting means controlled by said gage-member.

2. The combination of a taper-socket, a gage-member adapted to make contact with the end of a taper piece carried by said socket, means for effecting relative motion between the socket and gage-member, and an electro-magnetically-controlled ejector associated with said socket, and dependent for its action upon contact between said gage-member and the taper piece carried by said socket.

3. The combination of a frame, a carrier, a series of taper sockets mounted on the carrier, a series of gage-members mounted on the frame adjacent the path of the end portions of taper pieces carried by said sockets, a series of ejectors mounted on the carrier, and electro-magnetic devices controlling the actuation of said ejectors and having circuits for which said gage-members form contact-members, the circuits being adapted to be completed through the taper pieces carried by said sockets.

4. The combination of a mounting, a removable socket carried thereby and provided with a taper bore, an ejector associated with said socket, and means controlling the actuation of said ejector, including a gage-member adapted to make contact with the end portion of a taper piece carried by said socket.

5. The combination of a series of taper sockts, ejectors associated with said sockets, a series of gage-members having contact surfaces adapted to engage the circumferential portions of the large ends of taper pieces carried by said sockets, and ejector controlling means controlled by said gage-members.

6. The combination of a series of taper sockets, a series of gage-members adapted to engage the large ends of taper pieces carried by said sockets, means for causing relative movement between the sockets and gage-members, ejectors associated with said sockets, and controlling means for said ejectors controlled by said gage-members.

7. The combination of a carrier, a series of taper sockets mounted thereon, a series of ejectors mounted on said carrier and associated with said sockets, a series of electro-magnetic devices controlling the actuation of said ejectors and having circuits provided with contact-members adapted to make contact with the end portions of taper pieces carried by said sockets, and a series of receptacles for receiving the assorted pieces as they are discharged from said sockets.

8. The combination of a rotary carrier, a series of taper sockets mounted thereon, a series of ejectors mounted on said carrier, a frame, a series of electro-magnetic devices mounted thereon and controlling the actuation of said ejectors, and provided with circuits having contact members adapted to contact with the end portions of taper pieces carried by said sockets, and a series of receptacles encircling said carrier and adapted to receive the assorted taper pieces as they are discharged by the ejectors.

9. The combination of a mounting, an adjustable sleeve therein, a taper socket removably mounted in said sleeve, an ejector associated with said socket, a gage-member adapted to contact with the end portion of a taper piece carried by said socket, means for effecting relative movement of the socket past the gage-member, and ejector-controlling means controlled by said gage-member.

10. The combination of a carrier, a series of adjustable sockets mounted thereon, a series of ejectors mounted on the carrier and associated with said sockets, a series of adjustable gage-members disposed adjacent the path of the ends of taper pieces carried by said sockets, and a series of electro-magnetic devices controlling the operation of said ejectors and controlled by said gage-members.

11. The combination of a series of taper sockets, a series of gage-members, a series of ejectors associated with said sockets, a series of movably mounted trips, means for moving the sockets and ejectors with relation to the gage-members and trips, a series of solenoids normally holding said trips out of the tripping position, said solenoids having circuits provided with circuit-breaking devices, and a series of solenoids controlling said circuit-breaking devices and having circuits adapted to be completed through said gage-members and taper pieces mounted in said sockets.

12. The combination of a rotary carrier, a series of sockets mounted thereon and provided with radial taper bores, a series of ejectors mounted on the carrier and provided with radial spring-actuated plungers, a series of latch-levers mounted on the carrier and normally restraining said plungers from action, a series of gage-members encircling the path of taper pieces carried by said sockets, and a series of electromagnetically-controlled trips having controlling circuits adapted to be completed as said gage-members make contact with the taper-pieces carried by said sockets.

13. The combination of a rotary carrier, a series of sockets mounted thereon, a series of ejectors mounted on the carrier and equipped with latch-members normally restraining the ejectors from action, a series of trip pawls mounted on a stationary support, a series of gage-members disposed adjacent the path of the end portions of pieces carried in said sockets, and electro-magnetic devices controlling said trip-pawls and having circuits controlled by said gage-members, said electro-magnetic devices being adapted to drop the trip-pawls to the tripping position when the gage-members make contact with the pieces carried by said sockets.

14. The combination of a rotary carrier, means for effecting vertical adjustment of said carrier, a series of sockets mounted on said carrier, a series of ejectors associated with said sockets, a series of gage-members disposed adjacent the path of the outer ends of said sockets, a series of discharge chutes through which the assorted articles are discharged by the ejectors, and a series of electro-magnetic devices controlling the actuation of the ejectors and having circuits controlled by said gage-members.

15. The combination of a carrier, a series of sockets mounted thereon, having open outer ends, a series of ejectors mounted on the carrier, a series of gage-members encircling the path of the sockets, a series of discharge chutes associated with said gage-members, removable receptacles associated with said discharge chutes, and ejector controlling means controlled by said gage-members.

16. The combination of a frame provided with an annular ledge, a series of receptacles removably mounted on said ledge, a series of discharge chutes mounted on the peripheral portion of said frame, a series of gage-members mounted on the peripheral portion of said frame and associated with said discharge chutes, a rotary carrier mounted in the frame, a series of radial taper sockets mounted on the peripheral portion of the carrier, a series of ejectors mounted on the carrier and provided with radial spring-actuated plungers, a series of latch-members mounted on the carrier and normally restraining the plungers, and a series of electro-magnetic devices mounted on the central portion of the frame above the carrier and having circuits controlled by said gage-members and equipped with trips adapted to trip said latch-members.

17. The combination of a frame provided with an annular ledge, a series of receptacles removably mounted on said ledge, a series of discharge-chutes mounted on the peripheral portion of said frame, a series of gage-members mounted on the peripheral portion of said frame and assoicated with said discharge chutes, a rotary carrier mounted in the frame, a series of radial taper sockets mounted on the peripheral portion of the carrier, a series of ejectors mounted on the carrier, and provided with radial spring-actuated plungers, a series of latch-members mounted on the carrier and normally restraining the plungers, a series of electro-magnetic devices mounted on the central portion of the frame above the carrier and having circuits controlled by said gage-members and equipped with trips adapted to trip said latch-members, and means for bringing said trips within the range of action of said magnetic devices.

18. The combination of a frame, a rotary carrier, a series of sockets mounted on the peripheral portion of said carrier, a series of ejectors associated with said sockets, a series of gage-members adjacent the path of said sockets, a series of latch-members mounted on the carrier and normally restraining the ejectors from action, a series of trip-pawls mounted on the central portion of the frame, a series of magnetic devices normally holding said trip-pawls out of the tripping position and having circuits controlled by said gage-members, and a wheel mounted on said carrier and equipped with cam-teeth adapted to restore the trip-pawls to the normal position.

19. The combination of a carrier, a series of sockets mounted thereon, a series of ejectors associated with said sockets, a series of gage-members mounted adjacent the path of said sockets, a pressure member mounted adjacent the path of said sockets and adapted to press taper pieces into said sockets, one of the gage-members being adapted to yield to permit the passage of over-size rollers, electro-magnetic devices controlling the discharge of said ejectors and controlled by said gage-members, means for effecting the discharge of ejectors which fail to be operated by the gage-members, and means for restoring the ejectors to the "set" position.

20. The combination of a rotary carrier, a series of sockets mounted thereon, a series of ejectors provided with radial plungers equipped with cams, a series of latch-members normally restraining said plungers, a series of gage-members encircling the path of said sockets, one of said gage-members being adapted to permit the passage of any over-size rollers which may be carried by said sockets, a series of magnetic devices equipped with trips and having circuits controlled by said gage-members, a fixed trip adapted to trip any plungers which fail to be operated by said first named trips, and a fixed cam adapted to engage the cams of said plungers and "set" the plungers.

21. The combination of a rotary carrier, a series of sockets mounted thereon, a series of ejectors associated with said sockets and equipped with spring-actuated plungers provided with cams, a series of latch-members normally restraining said plungers, a series of gage-members encircling the path of said sockets, a series of stationary magnetic devices equipped with trips normally held out of the tripping position by said magnetic devices, said magnetic devices having circuits controlled by said gage-members, a fixed trip adapted to trip any plunger which fails to be operated by said first-named trip, a fixed cam adapted to engage the cams of said plungers and restore the plungers to the "set" position, and a cam carried by said carrier adapted to restore said trips to positions within the range of the magnetic action of said magnetic devices.

22. In means of the character set forth, the combination of a series of taper sockets which are adjustable in the directions of their axes, adjustable gage-members arranged in graduated series and adapted to make contact with taper rollers carried by said sockets, a series of ejectors associated with said sockets, and a series of electro-magnetic devices controlling the actuation of said ejectors and having circuits controlled by said gage-members.

23. The method of gaging a taper piece which comprises introducing said piece into an open-ended taper-socket, and bringing the end portion of said piece into contact with a gaging member.

24. The method of gaging and assorting taper rollers which comprises introducing the rollers into open-ended taper-sockets, moving the sockets carrying the rollers past a series of graduated end contact-members, and ejecting the rollers from the sockets by electro magnetically-controlled devices which have circuits adapted to be completed by the end portions of the rollers.

25. The method of gaging taper rollers which comprises introducing the rollers into taper sockets and carrying them past a series of contact-members which bear the same relation to the large ends of the rollers as does the thrust-flange of the cone of the bearing in which the rollers are to be used.

26. The method of gaging and assorting taper rollers which comprises carrying the rollers in open-ended taper-sockets past a series of graduated gage-members adapted to make contact with the end portions of the rollers, and ejecting the rollers from said sockets in assorted condition by means of ejecting devices controlled by electro-magnetic devices having circuits controlled by said gage-members.

27. The combination of a series of sockets having open ends and adapted to receive pieces to be sorted and carry them with their ends projecting from said sockets, a graduated series of gage-members disposed adjacent the path of the projecting ends of pieces carried in said sockets, means for effecting relative motion between the series of sockets and the series of gage-members, a series of ejectors associated with said sockets, and electro-magnetic controlling means for said ejectors controlled by said gage-members.

28. The combination of an open ended socket, an ejector disposed at one end of said socket, a gage-member disposed in position to make contact with the end portion of a piece carried by said socket and projecting from the other end thereof, means for effecting relative motion of the socket and gage-member past each other, and electro-magnetic means controlled by said gage-member and controlling said ejector.

29. The combination of a rotary carrier, a series of sockets mounted thereon having open outer ends, a series of ejectors mounted on the carrier, a series of ejectors encircling the path of the outer ends of said sockets, and electro-magnetic devices controlling the actuation of said ejectors and having circuits for which said gage-members form contact members, the circuits being adapted to be completed through pieces carried by said sockets.

30. The combination of a taper-socket adapted to receive a taper piece for gaging purposes, and a gage-member adapted to contact with the end portion of a taper piece carried in said socket.

GEORGE L. MILLER.